United States Patent Office 3,646,128
Patented Feb. 29, 1972

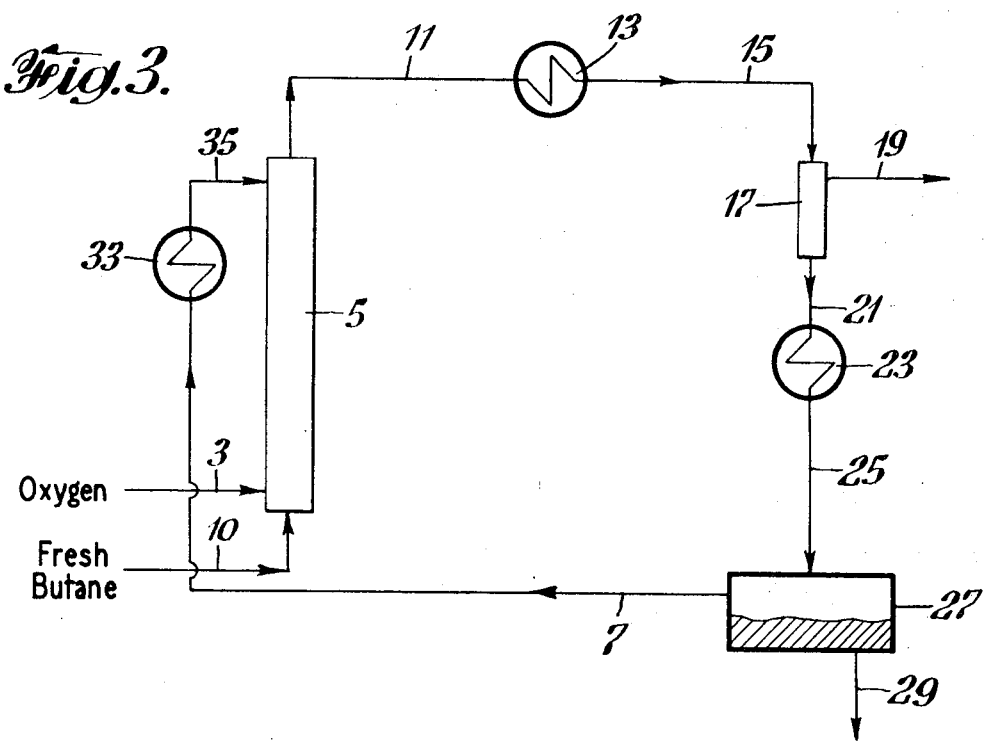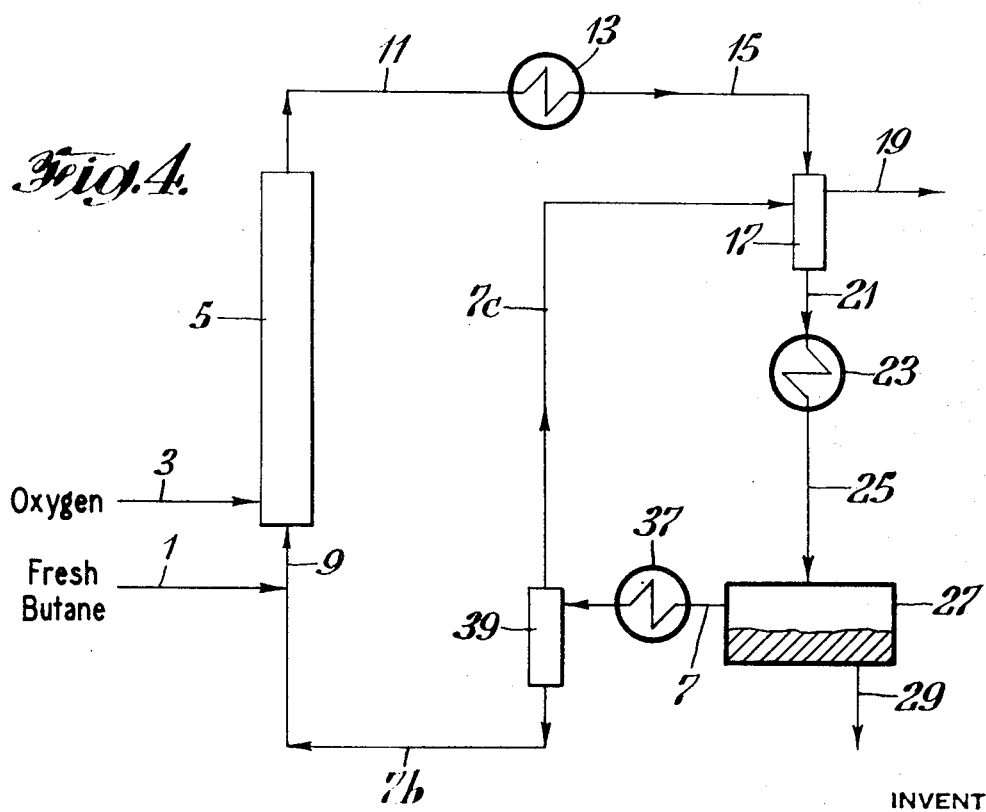

3,646,128
OXIDATION OF BUTANE
Norman R. Cox and John B. Saunby, St. Albans, W. Va., assignors to Union Carbide Corporation
Continuation of application Ser. No. 474,699, July 26, 1965. This application May 23, 1969, Ser. No. 828,445
Int. Cl. C07c 49/10, 53/08
U.S. Cl. 260—533 R
9 Claims

ABSTRACT OF THE DISCLOSURE

In the liquid phase oxidation of butane the total productivity as well as the productivity of methyl ethyl ketone can be improved by treatment of recycle butane in order to reduce the concentration of carbon oxides, water and methyl ethyl ketone dissolved therein. Similar improvements can be achieved by recycling butane to the top rather than to the bottom of the reaction zone.

---

This application is a continutaion of application Ser. No. 474,699, filed July 26, 1965 and now abandoned.

This invention relates to a process for non-catalytic oxidation of butane in the liquid phase. In one aspect the present invention is concerned with improving the total productivity of this process. In another aspect this invention is directed to selectively increasing the productivity of methyl ethyl ketone produced in this process.

The oxidation of butane is a well-known process and there are numerous patents and publications relating to both liquid phase and vapor phase oxidation of butane, catalytically and non-catalytically. Most, if not all of the prior art in this field describe processes which are principally aimed at maximizing the production of acetic acid. Other oxygenated organic compounds such as alcohols, aldehydes, ketones, esters, etc., are also produced in various amounts though in considerably less quantities than acetic acid.

Non-catalytic, liquid phase oxidation of butane is a relatively simple process. All that is required is butane and oxygen charged to a reactor and a sufficient quantity of heat to initiate the reaction. The conditions in the reactor are such that the reaction is carried out in the liquid phase. Once initiated, the reaction is highly exothermic and adequate heat removal from the reactor is necessary for successful operation of the process, particularly on an industrial scale. The reactor effluent is introduced into a product recovery section to recover acetic acid, methyl ethyl ketone and other oxygenated organic compounds, which are produced by the reaction. A typical product recovery section, for example, includes a gas separator where the reactor effluent is degasified to remove carbon dioxide, carbon monoxide, inert gas (nitrogen), and some unreacted butane. The degasified reactor effluent is then cooled and introduced into a decanter wherein two liquid layers are formed, an upper butane layer and a lower product layer. The upper layer is recycled to the reactor, and the lower layer consisting essentially of methyl ethyl ketone, acetic acid and other oxygenated organic compounds is withdrawn as product. Methyl ethyl ketone and acetic acid constitute the major portion of the products.

Commercially, it is highly desirable and economical to operate the above process at high productivity. The term productivity as employed herein refers to the total weight of liquid oxygenated products produced per cubic foot of reactor per hour. Accordingly, the productivity of methyl ethyl ketone denotes the weight of methyl ethyl ketone produced per cubic foot of reactor per hour. It is needless to emphasize that in the oxidation of butane on an industrial scale even modest increase in productivity results in considerable overall economic improvement in the process.

The prior art is replete with suggestions directed to improving the productivity of the butane oxidation process and several means have been proposed to accomplish their objective. A classical means involves temperature control within the reactor by removing the heat of reaction. This is accomplished by providing the reactor with internal or external cooling surfaces such as cooling coils, etc. Another suggestion involves cooling a portion of the reaction products and recycling the same to the reactor. Still another suggestion comprises slow and controlled oxidation of butane which is effected by low rate of butane addition to the reactor and/or lowering the oxygen concentration in the reactor, or by the use of large quantities of inert diluents such as nitrogen or inert organic compounds in the reactor.

While the foregoing means suggested by the prior art have been partly successful, they nevertheless suffer from one or more inherent limitations. For example, it is readily appreciated that the use of cooling surfaces is both impractical and uneconomical in industrial operation. The slow and controlled oxidation of butane necessitates operation at reduced rates and capacity which result in low productivity. Furthermore, the prior art processes are primarily concened with producing and maximizing the production of acetic acid and they are not concerned with selectively increasing the productivity of methyl ethyl ketone.

It is therefore an object of this invention to provide a process for non-catalytic, liquid phase oxidation of butane whereby marked improvement is realized in the total productivity of the process as compared to the heretofore known prior art processes. It is a further object of this invention to provide a process for non-catalytic, liquid phase oxidation of butane whereby the productivity of methyl ethyl ketone is selectively increased relative to the productivity of acetic acid.

It has been unexpectedly discovered that in the liquid phase oxidation of butane the productivity of the process can be markedly improved by selecting and maintaining the proper conditions in the product recovery section of this process. By judicious selection of the operating conditions in the product recovery section as will be described hereafter, the productivity of the process can be significantly increased.

It has been further discovered that increased productivity can be realized by introducing the recycle butane to the top rather than to the bottom of the reactor as it is customary in the art. Alternatively, the recycle butane can be subjected to a liquid-vapor separator. The vapors from this separator are introduced directly into the main gas separator wherein the reactor effluent is degasified. The liquid from the vapor-liquid separator is introduced to the reactor. These operations also result in increased productivity of methyl ethyl ketone as well as the total productivity.

It has been discovered that the removal of carbon monoxide, carbon dioxide and water from the butane recycle to the reactor results in an increase in the total productivity of the process.

Methyl ethyl ketone is an intermediate product in the oxidation process described herein and its production is favored by operating at low butane conversion. Both the reaction products and the butane recycle to the reactor contain methyl ethyl ketone.

It has been further discovered that the removal of methyl ethyl ketone from the butane recycle to the reactor results in an increase in the productivity of methyl ethyl ketone relative to the productivity of acetic acid.

The process of this invention and the improvements realized therefrom will be more clearly understood with reference to the accompanying drawings wherein like numerals are employed to designate like parts.

In the drawings:

FIG. 3 is also a flow diagram of the process shown in FIG. 1 wherein the recycle butane is introduced to the top of the reactor; and FIG. 4 is still another flow diagram of the process shown in FIG. 1 wherein the recycle butane is subjected to a vapor-liquid separation step and the liquid from the separator is introduced to the reactor.

Figure 1:
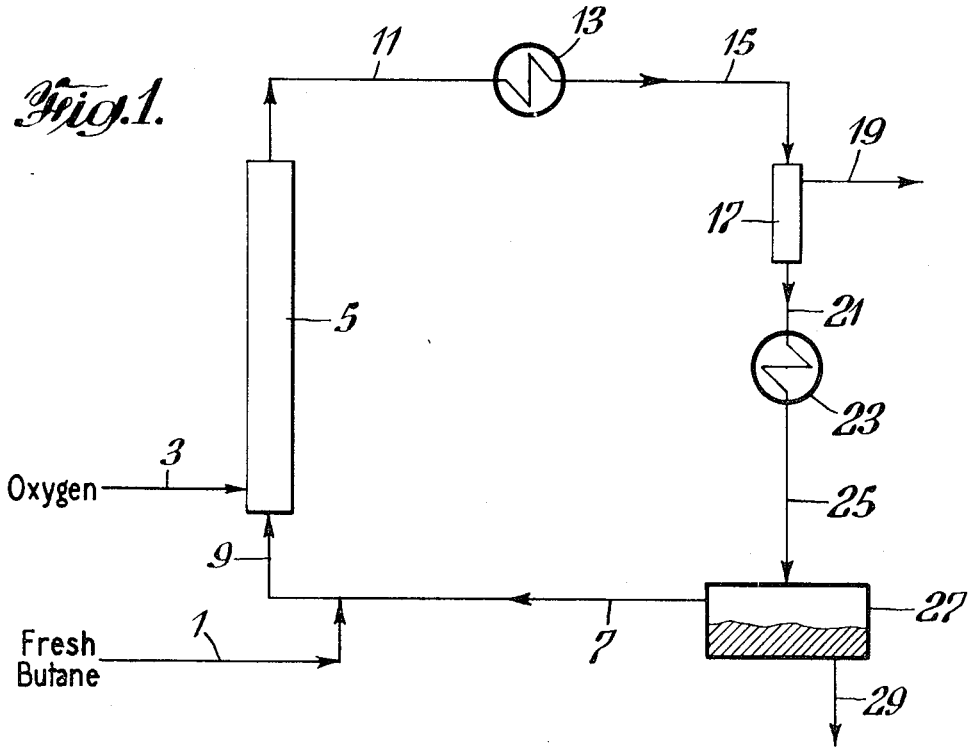
FIG. 1 is a flow diagram of a typical process for the oxidation of butane in the liquid phase.

Referring to the drawing, liquid butane and oxygen (or any gas containing molecular oxygen) are introduced via lines 1 and 3, respectively, into reaction zone 5. Line 1 is joined by butane recycle line 7 prior to entering the reaction zone 5 via conjoint line 9. The reactor effluent is withdrawn via overhead line 11, cooled in heat-exchanger 13 and introduced via line 15 into a main gas separator 17. In this separator inert gases such as nitrogen, carbon monoxide, carbon dioxide and some unreacted butane are vented through vent line 19 into the atmosphere. The butane can be recovered and recycled to the reaction zone if desired. The remaining materials are conducted via line 21, cooled in heat exchanger 23 and introduced via line 25 into a decanter 27. In the decanter the liquid materials, having been cooled in heat exchange 23, separate in two liquid phases. The upper liquid phase is rich in butane and contains some water, CO, $CO_2$, methyl ethyl ketone and other oxygenated organic compounds dissolved in butane. This layer is recycled via line 7 to reaction zone 5 after joining butane feed line 1 as previously described. The lower liquid layer which consists of the ultimate products of the reaction is withdrawn via line 29. The products are mainly methyl ethyl ketone and acetic acid but also include other oxygenated organic compounds.

The oxidation reaction in the reaction zone is effected at a temperature of from about 125° C. to about 250° C., preferably between about 150° and about 200° C., and under superatmospheric pressure ranging from about 500 p.s.i.g. to about 2000 p.s.i.g., preferably from about 700 p.s.i.g. to about 1200 p.s.i.g. It should be mentioned however, that the temperature and pressure in the reaction zone are not per se critical in this invention so long as the reaction is carried out in the liquid phase.

As was previously mentioned, the presence of carbon oxides, water and methyl ethyl ketone has a deleterious effect upon the productivity of the process. The presence of carbon oxides and water has deleterious effect upon the total productivity of the process whereas the presence of methyl ethyl ketone in the butane recycle results decreased productivity of methyl ethyl ketone. The removal of carbon oxides and water increases the total productivity of the process whereas the removal of methyl ethyl ketone increases the productivity of methyl ethyl ketone relative to acetic acid.

Several methods can be employed for the removal of carbon oxides, water and methyl ethyl ketone from the butane recycle. Water can be removed by treating the recycle with known desiccants, drying agents, etc. Carbon oxides can be removed by treatment of the recycle with a caustic solution, and methyl ethyl ketone can be separated from the recycle by extraction using any one of known extraction agents.

Figure 2:
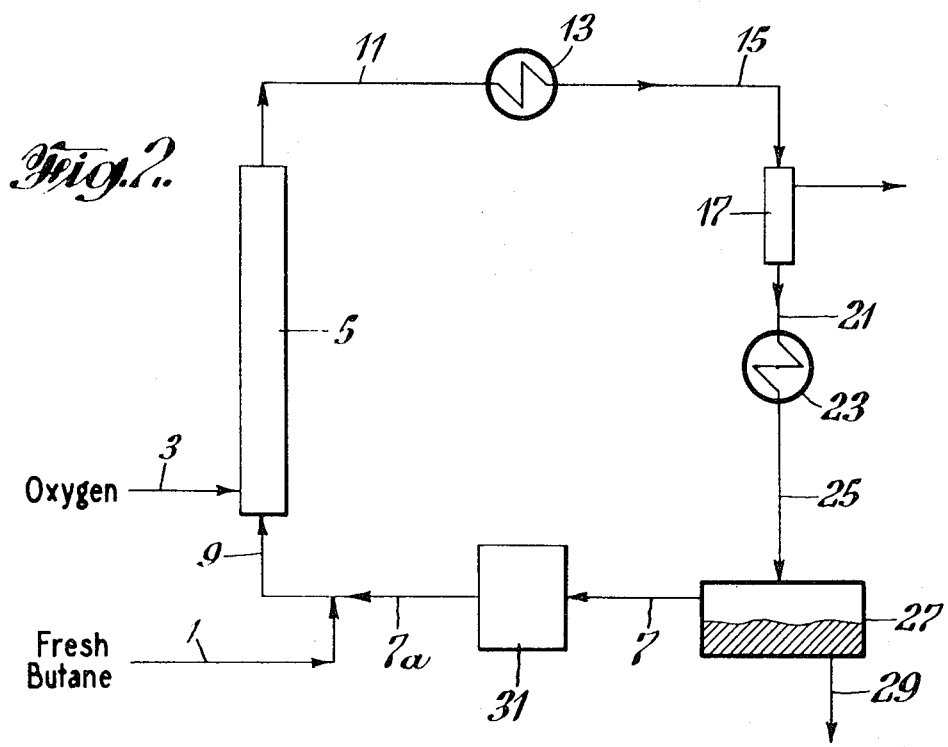
FIG. 2 is a flow diagram of a process such as that shown in FIG. 1 but wherein the butane recycle is subjected to a "recycle treating section;"

FIG. 2 illustrates one embodiment of the invention wherein the butane recycle from decanter 27 is conveyed via line 7 into a recycle treating section 31. This section may comprise a caustic tower for the removal of carbon dioxide, a drying column for the removal of water and an extraction column for the removal of methyl ethyl ketone. The treated recycle stream flows through line 7a which joins fresh butane feed line 1 and enters reaction zone 5 through conjoint line 9.

It should be emphasized that the methods employed for the reduction of concentration of carbon oxides, water and methyl ethyl ketone in the recycle are not in themselves critical in this invention. Regardless of the method which is employed, reduction of concentrations of these materials is the butane recycle is accompanied by an increase in the total productivity, the productivity of methyl ethyl ketone or both as the case may be.

It has been further discovered that the concentration of carbon oxides and water in the recycle butane can be reduced by operating the main gas separator 17 at a temperature higher than about 65° C., but no higher than the reaction temperature, preferably from about 80° C. to about 150° C. Thus all or major portions of carbon oxides, water, unreacted butane, and inert gases can be removed in the separator with a consequent reduction in the amount of these gases in recycle butane in the decanted 27. Similarly, the methyl ethyl ketone content of the butane-rich layer in the decanter can be reduced or minimized by effecting the formation of two liquid layers in the decanter at a temperature lower than about 65° C., preferably from about 0° C. to about 50° C.

When the temperatures in the main gas separator and the decanter are maintained within the above-described temperature ranges, the concentration of carbon oxides, water and methyl ethyl ketone in the recycle butane are considerably reduced and therefore the productivity of the process is increased accordingly. The recycle butane may then be subjected to the recycle treating section to further reduce and minimize the concentrations of these materials prior to introduction of the recycle to the reaction zone.

The following examples will serve to further illustrate the beneficial results which can be achieved by reducing the concentrations of carbon oxides, water and methyl ethyl ketone in the recycle butane.

EXAMPLE 1

This example illustrates the effect of reducing the carbon dioxide concentration of recycle butane upon the total productivity.

Four runs were made wherein the method of operation was the same in all cases and was essentially as described and illustrated in FIG. 2. The reaction in all four runs was carried out in the liquid phase at a temperature of 180° C. and a pressure of 800 p.s.i.g. Other process conditions were essentially the same except that the recycle butane in each case was treated to reduce the carbon dioxide concentration to different levels. The resulting increase in total productivity is shown in the following Table 1.

TABLE 1

| Run Number | Weight percent carbon dioxide in feed [1] | Total liquid productivity [2] |
| --- | --- | --- |
| 1 | 16.2 | 14.8 |
| 2 | 14.2 | 16.0 |
| 3 | 8.1 | 21.0 |
| 4 | Nil | 26.0 |

[1] All the carbon dioxide in the feed was present in the recycle.
[2] Pounds of oxygenated organic compounds per cubic foot of reactor volume per hour.

EXAMPLE 2

This example illustrates the effect of reducing the water concentration of recycle upon total productivity.

Four runs were made in a manner similar to Example 1. The reaction in all four runs was carried out at a temperature of 180° C. and a pressure of 800 p.s.i.g. Other process variables were essentially the same in all runs except that the recycle butane in each case was treated to reduce the water concentration to different levels. The resulting increase in total productivity is shown in the following table.

TABLE 2

| Run Number | Weight percent water in feed [1] | Total liquid productivity [2] |
| --- | --- | --- |
| 1 | 3.0 | [3] |
| 2 | 2.7 | 19.1 |
| 3 | 1.6 | 23.6 |
| 4 | Nil | 26.1 |

[1] All the water in the feed was present in the recycle.
[2] Pounds of oxygenated organic compounds per cubic foot of reaction volume per hour.
[3] Oxidation reaction could not be maintained.

EXAMPLE 3

This example illustrates the effect of reducing the methyl ethyl ketone content of recycle upon the productivity of methyl ethyl ketone.

Five runs were made as in the preceding two examples. The reaction in all five runs was carried out at a temperature of 175° C. and a pressure of 800 p.s.i.g. Other process variables were essentially the same in all runs except that the recycle was treated to reduce the concentration of methyl ethyl ketone to different levels. The resulting increase in the productivity of methyl ethyl ketone is apparent from an examination of the following table.

TABLE 3

| Run Number | Weight percent of methyl ethyl ketone in feed | Butane efficiency to methyl ethyl ketone [1] |
| --- | --- | --- |
| 1 | 18.0 | Nil |
| 2 | 12.0 | 4.8 |
| 3 | 5.8 | 13.0 |
| 4 | 3.5 | 15.9 |
| 5 | Nil | 20.2 |

[1] The butane efficiency to methyl ethyl ketone is a measure of productivity of methyl ethyl ketone. It denotes the percentage of butane which is converted to methyl ethyl ketone.

EXAMPLE 4

This example illustrates the effect of change in the temperature of the main gas separator upon the carbon dioxide concentration of the recycle and hence the productivity of the process.

The experimental set-up and the method of operation in this example were essentially as described and illustrated in connection with FIG. 1 of the drawings. Four runs were made wherein the reaction temperature and pressure in each run were 180° C. and 800 p.s.i.g., respectively. In each run however the separator temperature was varied. Other process conditions were essentially the same in all runs. The results are shown in the following table.

TABLE 4

| Run Number | Separator temperature, °C. | Weight percent carbon dioxide in recycle |
| --- | --- | --- |
| 1 | 65 | 6.3 |
| 2 | 100 | 5.2 |
| 3 | 120 | 4.2 |
| 4 | 135 | 4.1 |

It has already been shown in Example 1 that a decrease in the carbon dioxide concentration of recycle is associated with an increase in the total productivity of the process.

EXAMPLE 5

This example illustrates the effect of change in the temperature of the decanter upon the carbon dioxide as well as upon the methyl ethyl ketone concentrations in the recycle.

Four runs were made in the same manner as in Example 4. The temperature and pressure in each run were 180° C. and 800 p.s.i.g., respectively. Other process conditions were essentially the same except that the temperature of the decanter was varied in each run. The results are shown in the following table.

TABLE 5

| Run Number | Temperature of decanter, °C. | Weight percent in recycle | |
| --- | --- | --- | --- |
| | | Carbon dioxide | Methyl ethyl ketone |
| 1 | 60 | 5.1 | 4.2 |
| 2 | 40 | 4.3 | 3.4 |
| 3 | 20 | 3.5 | 2.2 |
| 4 | 17 | 3.2 | 2.0 |

As was already shown in Example 1 a decrease in the concentration of carbon dioxide in the recycle is associated with an increase in the total productivity of the process. Furthermore a decrease in the concentration of methyl ethyl ketone of the recycle was shown (Example 3) to be accompanied by an increase in the productivity of methyl ethyl ketone in the process.

In all of the foregoing examples the principal products were methyl ethyl ketone and acetic acid along with some other oxygenated organic compounds.

In still another embodiment of this invention, increased productivity can be realized by introducing the butane recycle, with or without preheating, to the top of the reaction zone. It has heretofore been a common practice to introduce the recycle at the bottom of the reaction zone. The recycle from the decanter is at a temperature below about 65° C. which is considerably lower than the temperature in the reaction zone. Thus when the recycle is introduced at the bottom of the reaction zone, the lower boiling materials in the recycle vaporize in the reaction zone and the vapors so generated occupy a substantial volume therein. Consequently, much of the butane (about 50%) is present in the reaction zone as vapor rather than liquid with a resultant decrease in total productivity. When the recycle is introduced to the top rather than the bottom of the reaction zone, the gaseous components leave the top and the liquid portion of the recycle remain in the reaction zone. Thus, little vapor is present in the reaction zone throughout the reaction.

The above embodiment is illustrated in FIG. 3 wherein the upper liquid layer in decanter 27 is withdrawn via line 7, heated through heat exchanger 33, if desired, and introduced to the top of reaction zone 5.

An alternative method to the last-mentioned embodiment of this invention is shown in FIG. 4. In this figure, the upper liquid layer from decanter 27 (butane recycle) is withdrawn via line 7, heated in preheater 37, and introduced into a vapor-liquid separator 39 which is usually maintained at a temperature below the reaction temperature, preferably at a temperature of from about 0° C. to about 100° C. below the reactor temperature. The vapors leaving separator 39 by-pass reaction zone 5 and are introduced directly into the main gas separator 17. The liquid leaving separator 39 flows through line 7b which joins fresh butane feed line 1 and thereafter enter reaction zone 5 via conjoint line 9.

The last two mentioned embodiments of this invention are further illustrated by the following examples.

EXAMPLE 6

This example illustrates the beneficial results obtained (in terms of increased total productivity) from introducing the recycle butane to the top rather than to the bottom of the reactor.

The experimental procedure employed in this example was essentially the same as described in connection with FIG. 3 of the drawings. Two runs were made under essentially similar conditions. In both runs the reaction temperature was 175° C. and the pressure was 800 p.s.i.g. The only difference in the two runs was that in one the recycle was introduced to the bottom of the reactor while in the other run, the recycle was introduced to the top of the reactor. The results are shown in the following table.

TABLE 6

| Run Number | Recycle feed point | Total liquid productivity [1] |
|---|---|---|
| 1 | Reactor bottom | 20.4 |
| 2 | Reactor top | 31.9 |

[1] Pounds of oxygenated organic compounds per cubic foot of reactor per hour.

It is noted from Table 6 that the total productivity of the process can be increased by about 50 percent when the recycle is introduced to the top rather than the bottom of the reactor.

EXAMPLE 7

This example illustrates the beneficial results obtained (in terms of increased total productivity) by the use of an external vapor-liquid separator to remove the vapors (low boiling materials) from the butane recycle prior to its introduction into the reactor.

The experimental procedures employed in this example were essentially the same as described in connection with FIGS. 3 and 4 of the drawings. Two runs were made, each at a reaction temperature of 175° C. and a pressure of 800 p.s.i.g. The first run was made essentially as in FIG. 3 and the second run was made essentially in the manner described in connection with FIG. 4. In the second run, the recycle butane was preheated to 150° C. and introduced to a vapor-liquid separator 24 inches long and having a diameter of 4 inches. About 6 to 10 inches of liquid was maintained in the separator which was operated at a temperature of 155° C. and a pressure of about 800 p.s.i.g. The results are shown in the following table.

| Run Number | Recycle feed point | Total liquid productivity [1] |
|---|---|---|
| 1 | Reactor top | 31.9 |
| 2 | External separator, then reactor bottom | 31.3 |

[1] Pounds of oxygenated organic compounds per cubic foot of reactor per hour.

Thus it is noted from Table 7 that the use of external recycle for the separation of vapors from liquids in the recycle results in increased total productivity which is comparable to that which is realized from the introduction of recycle to the top, rather than to the bottom of the reaction zone.

We claim:
1. A continuous process for the oxidation of butane comprising the following steps:
 (a) reacting butane and oxygen in a reaction zone wherein said reaction is effected essentially in the liquid phase;
 (b) cooling the effluent of said reaction zone and introducing the same into a liquid-separation zone wherein two liquid layers are formed, an upper butane-rich layer containing dissolved carbon oxides including carbon dioxide, water, and methyl ketone and a lower layer containing oxygenated organic reaction products predominantly methyl ethyl ketone and acetic acid;
 (c) withdrawing said upper layer from the liquid-separation zone and treating same to reduce the concentration of the dissolved carbon oxides including carbon dioxide, water, and methyl ethyl ketone whereby the concentration of carbon dioxide and water are reduced by at least about 10 percent by weight;
 (d) recycling the treated upper layer to the reaction zone; and
 (e) withdrawing the lower layer from the liquid-separation zone.

2. The process defined in claim 1 wherein the liquid-separation zone is maintained at a temperature below about 65° C.

3. The process defined in claim 2 wherein the liquid-separation zone is maintained at a temperature of from about 0° C. to about 50° C. and the concentrations of carbon dioxide and water are reduced by at least about 50 percent by weight in step (c).

4. The process defined in claim 1 wherein the following step is carried out after step (a) and before step (b); introducing the effluent from said reaction zone into a gas-separation zone wherein gaseous materials are vented while maintaining said gas-separation zone at a temperature which is higher than about 65° C., but no higher than the reaction temperature.

5. The process defined in claim 4 wherein the liquid-separation zone is maintained at a temperature below about 65° C.

6. The process defined in claim 5 wherein the liquid-separation zone is maintained at a temperature of about 0° C. to about 50° C. and the concentrations of carbon dioxide and water are reduced by at least about 50 percent by weight in step (c).

7. The process defined in claim 1 wherein the upper layer is recycled by introducing such upper layer to the reaction zone at a point near the top thereof.

8. The process defined in claim 1 wherein the upper layer is introduced during step (c) into a vapor-liquid separation zone wherein the vapors are removed.

9. The process defined in claim 4 wherein the upper layer is introduced during step (c) into a vapor-liquid separation zone wherein the vapors are removed and the treated upper layer is recycled by introducing same to the reaction zone at a point near the top thereof.

References Cited
UNITED STATES PATENTS

| | | | |
|---|---|---|---|
| 3,282,994 | 11/1966 | Cox et al. | 260—533 |
| 3,196,182 | 7/1965 | Cox | 260—597 |
| 2,801,259 | 7/1957 | Lake | 260—452 |

LORRAINE A. WEINBERGER, Primary Examiner

R. D. KELLY, Assistant Examiner

U.S. Cl. X.R.

260—597 R